United States Patent [19]

Viner

[11] 4,433,505
[45] Feb. 28, 1984

[54] SWINGING PLUG DOOR

[75] Inventor: George C. Viner, Chippenham, England

[73] Assignee: Westinghouse Brake and Signal Co., Ltd., Chippenham, England

[21] Appl. No.: 296,163

[22] Filed: Aug. 25, 1981

[30] Foreign Application Priority Data

Sep. 4, 1980 [GB] United Kingdom ................ 8028629

[51] Int. Cl.³ .............................................. E05C 7/06
[52] U.S. Cl. ...................................... 49/110; 49/114; 49/115
[58] Field of Search ................................. 49/109–112, 49/104, 114, 115

[56] References Cited

U.S. PATENT DOCUMENTS 2,298,158 10/1942 Piron ................................ 49/110 X

FOREIGN PATENT DOCUMENTS 1459153 4/1969 Fed. Rep. of Germany ........ 49/110

Primary Examiner—Kenneth Downey
Attorney, Agent, or Firm—Larson and Taylor

[57] ABSTRACT

A plug door for a vehicle, such as a railway carriage, is carried and driven by a swinging lever which has a sliding fulcrum mechanism the effect of which is to flatten the arc through which the door is carried. The edge of the door which trails in an opening movement is guided either by means of a relatively long pivot arm or by a curved or straight track. The alternative guide means give different trajectories to the leading edge of the door, the long pivot arm guide keeps the door closest to the side of the vehicle during opening. A duplicate swinging lever with sliding fulcrum mechanism as a guide for the trailing edge will move the door parallel to the side of the vehicle and the sliding fulcrums will substantially reduce the outward excursion. By mounting the driving swinging lever over-center, i.e. closer to the trailing edge of the door the plug action is provided for so that a closed door may be flush with the vehicle skin.

10 Claims, 2 Drawing Figures

SWINGING PLUG DOOR

The invention relates to a swinging plug door particularly, but not exclusively, for vehicles, especially passenger vehicles.

Doors of the plug type generally fit flush with a vehicle side in the closed position and share the common feature that the initial/final phase of their opening/closing movement is either an inward or outward plug-like lateral movement as appropriate. It is often preferred in passenger vehicles, where interior accommodation space is limited, to arrange that on opening a plug door is initially moved laterally outwards and then swung sideways with the reverse sequence for closing so that the volume swept by the door is outside the vehicle.

Sliding plug doors are known in which the sideways phase of the opening/closing movement is a genuine sliding movement where the door slides in a plane close to and parallel with the vehicle side. Such arrangements as this however have the double disadvantage that the door driving mechanism is complicated and expensive to produce and, that fixed guides are often fitted to the external surface of the vehicle which to some extent counter the advantages of providing a flush fitting plug door.

Swinging plug doors as compared to sliding plug doors provide a less complicated operating mechanism which can be arranged, by careful positioning of the swing axis or axes, to dispense with separate actuators for the plug and sliding phases of movement. However, known swinging plug doors require a substantial area of free space to accommodate the volume swept by a door during opening and closing. In passenger vehicles the doors are almost invariably swung outwards with the result that embarking passengers must stand well clear of the vehicle side until the doors are fully open. Also railway vehicles equipped with air suspension could encounter the problem of doors fouling the platform when opening in the event of air suspension failure.

It is an object of the present invention to provide a swinging plug door arrangement in which the outward excursion of the door during opening and closing movements is substantially reduced compared to known swinging plug door arrangements.

According to the invention there is provided a swinging plug door comprising a plug door pivotally attached to one end of a swinging lever which is pivotally attached at its other end to a rotatable driving crank and, intermediate said ends has a sliding fulcrum mechanism, in which the fulcrum axis of the lever is slidable along a path lying in a direction generally between the crank and the door, so that in operation rotation of the crank causes the lever to swing about its fulcrum axis and to slide relative thereto to carry the door through a flattened arc between open and closed positions.

Preferably the door is operated by a single swinging lever or pair of such levers, one at the top and another at the bottom, and the edge of the door which is trailing in an opening movement is guided either by means of a curved or straight track, or by means of a long pivot arm.

A bi-parting door arrangement comprises a pair of swinging plug doors each according to the invention and which are adapted to move in opposite directions to open and close.

For a better understanding of the invention and how it may be carried into practice reference will now be made, by way of example only, to the accompanying drawings in which.

Figure 1:
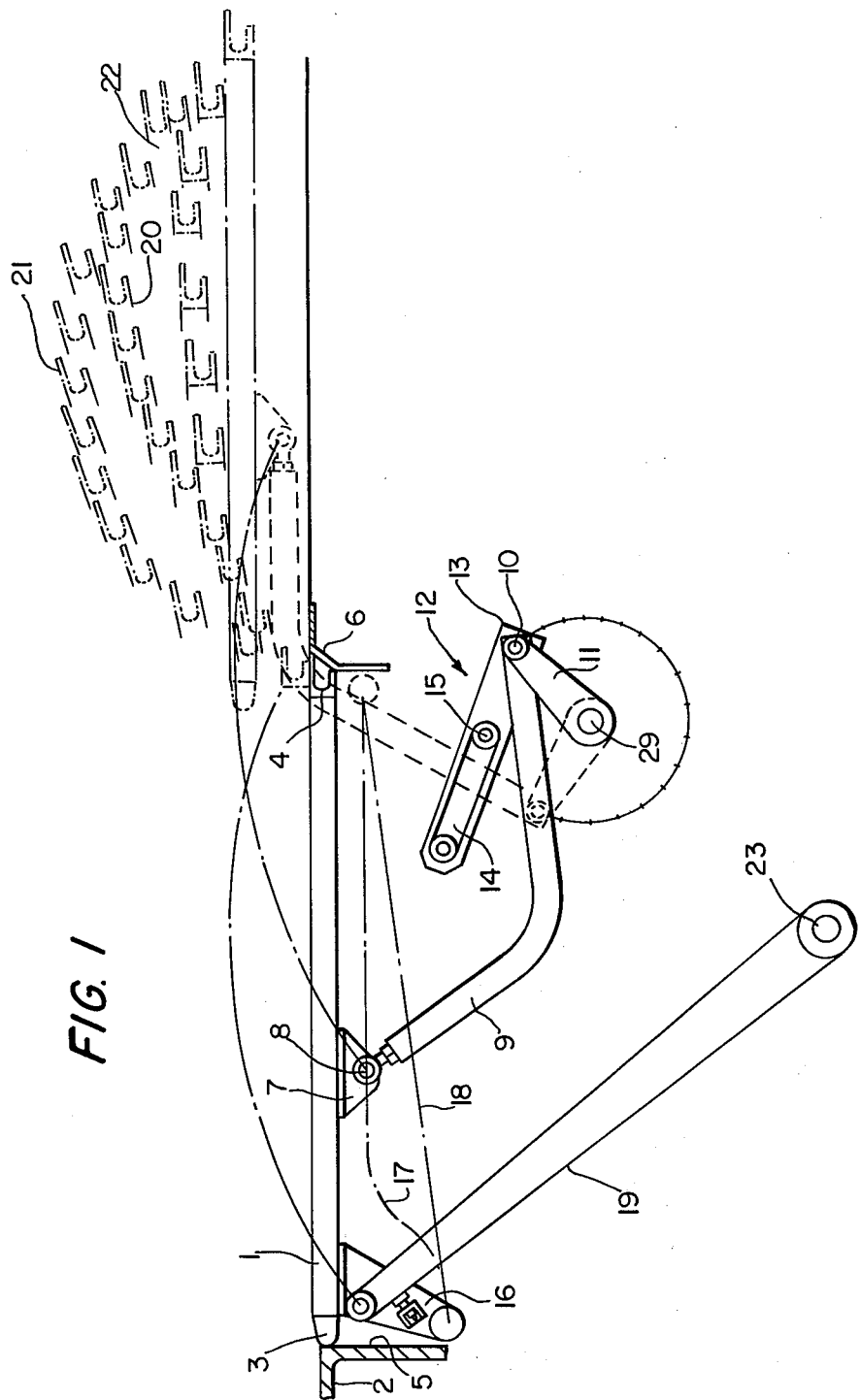
FIG. 1 shows a plan view of a single swinging plug door arrangement.

Referring now to FIG. 1 reference 1 indicates a single 24 inch wide swinging plug vehicle door and reference 2 indicates the external side surface of the vehicle, with which the door 1 will be seen to be flush fitting in the closed position. The vertical sides of door 1 carry full-length edge seals 3 and 4. Seal 3, on the edge of the door which trails in an opening movement, in this example has a hollow convex section which when the door is closed is slightly compressed against an inner vertical face 5 of the door frame, or in a double door arrangement see FIG. 2 against the face of a corresponding seal on the opposite door. Seal 4 on the leading edge has a double, an inner and outer, lip configuration in which both parts bear against an opposite and outwardly chamfered vertical face 6 of the door frame. In the closed position seal 3 is compressed in a direction essentially co-planar with the door 1 and the seal 4 is pressed against face 6 effectively sealing the gaps between the door and the frame and presenting a substantially smooth surface flush with the outer skin of the vehicle.

For opening and closing the door 1 is connected to a driving mechanism through a bracket 7 secured to the top inner margin of the door at a position just over midway along the door nearer the edge which trails in an opening movement and to which is pivotally attached at 8 the outer end of a cranked swinging lever 9. The inner end of lever 9 is also pivotally attached at 10 to a rotatable driving crank 11 and carries a sliding fulcrum mechanism, generally indicated at 12, which effectively provides a pivot movable relative to the lever 9 and about which it may be swung.

The sliding fulcrum mechanism 12 comprises a member 13 fixed relative to the lever, it may be rigidly secured to or formed integrally with the inner end of lever 9, and is formed with an elongate slot 14 having its axis lying along a line joining the pivots 8 and 10 at opposite ends of lever 9. Engaged with slot 14 is a stationary pin 15 which constitutes the fulcrum axis about which lever 9 pivots. Pin 15 is fixed with respect to the vehicle and conveniently is secured to the door frame and in the illustrated embodiment, lies on the pitch circle of rotation of pivot 10 carried by the driving crank 11. However, its position may be fixed radially inwards or outwards of the illustrated position in order to provide effects or features of door movement which will be described below in connection with the operation of the arrangement.

The slot 14 could also be formed with alternative alignments to that shown, as will also be described below, in conjunction with or independently from alternative positioning of pin 15, providing only that engagement of pin and slot is maintained.

At the edge of door 1 which trails in an opening movement adjacent to seal 3 a further bracket 16 is attached to the top of the inner margin of the door and carries a roller engaged with a guide track of either curved plan configuration or straight plan configuration respectively indicated by references 17 and 18. Alternatively, in place of track 17 or 18, a long guide arm 19 may be pivoted at one end to a modified form of bracket 16 and at its opposite end to a fixed point on the vehicle structure. This pivoted guide arm 19 is relatively longer than the swinging lever 9.

Referring again to FIG. 1 for a description of the operation of the arrangement, the door 1 and swinging level 9 are shown in solid line in the closed position and in chain-linked line in the open position. In addition, there is shown at references 20, 21 and 22 the trajectories of the lip seal 4 and thus, the leading edge of the door in an opening movement, for alternative embodiments incorporating respectively a curved track 17, a straight track 18 and a long pivot arm 19. In all three instances the final position of the door 1 is the same, that is, outside the vehicle, parallel to the side thereof and with the guide bracket 16 lying adjacent the side face 6 of the door frame. Thus, all three guide means 17, 18 and 19 deliver the door 1 from the same initial position to the same final position. It will also be seen from FIG. 1 that the swinging lever 9 is sufficiently cranked, i.e. its middle portion is formed with an angle in a horizontal plane sufficient to clear the vertical upright edge 6 of the door frame in the open position.

In actual operation of the door mechanism from a closed position crank 11 is driven in a clockwise direction by a vertical drive shaft 29, powered by a rotary actuator mechanism (not shown). Initially the fulcrum of lever 9, that is pin 15, is at the end of slot 14 nearest the crank 11 providing the maximum available velocity ratio at the outer end of lever 9 carrying the door 1 on bracket 7. The positioning of bracket 7 behind the door centre-line towards the bracket 16 on the guided trailing edge ensures that the leading edge is rapidly "kicked out" in a direction substantially perpendicular to the side of the vehicle, safely lifting seal 4 away from the face 6 and the side of the vehicle. Continued clockwise rotation of crank 11 causes lever 9 to swing about fulcrum pin 15, throwing door 1 towards the open position in a generally curved trajectory. At the same time the lever 9 and the associated slotted member 13 are pulled inwardly, with respect to the fixed pin 15, by the first half of the rotation of crank 11 causing pin 15 to slide along the slot 14 progressively lowering the velocity ratio of pivot 8 at the door end of lever 9. Through the second half of the rotation the reverse effect occurs and the slotted member 13 is pushed outwards with respect to pin 15 again increasing the velocity ratio towards maximum. This progressive decrease and then increase in the velocity ratio of the outer and of lever 9 effectively flattens the middle portion of the swing arc of the door 1.

As previously mentioned the door 1 is povoted at 8 to the outer end of the swinging lever 9 by means of bracket 7 attached to a middle section of the door. The trailing edge bracket 16 of the door is engaged with guiding means 17, 18 or 19 which determines the angle of the door with respect to the side of the vehicle throughout an opening/closing operation. The maximum outward excursion of the door, i.e. the trajectory of the leading edge of the door, is consequently set by the angle of inclination of the line between brackets 16 and 7 with respect to the vehicle side-line. The greatest such inclination is produced by the straight track 18 giving outermost trajectory 21 in FIG. 1. The curved track 17 has an initial short length parallel to the vehicle side so that at the beginning of an opening movement the initial kickout is preserved. The track then curves outwards as far as is practicable to carry the trailing edge of the door beyond the vehicle side-line in order to lessen the inclination of the door as much as possible. The result is trajectory 20, in FIG. 1, for the leading edge of the door intermediate trajectory 21 and preferred tracjectory 22 produced by long pivot arm 19.

The length of arm 19 and its inboard pivot 23 must be chosen with regard to several relevant factors principally the maximum outward excursion of the trailing edge of door 1, internal structural members which may limit the arc angle subtended at pivot 23 and the position of members sufficiently strong to support pivot 23. If the arm 19 is too short the excursion of the leading edge of the door will be minimised at the expense of providing the trailing edge with greater excursion. It is preferred therefore to make arm 19 just long enough to maintain the maximum excursion of the door in the trajectory of the leading edge of the door, in an opening movement i.e. trajectory 22 in FIG. 1.

Ideally, of course, the door should be maintained parallel to the vertical plane of the vehicle side throughout the opening/closing movements. This can be achieved by duplicating the swinging arm-sliding fulcrum mechanism at the top and bottom of the door since it is only such an arrangement that can reproduce the flattened arc accurately. In such an arrangement only one operating mechanism need be driven leaving the other mechanism to "follow," merely acting as a guiding arrangement. Alternatively both mechanisms can be powered so that they drive in tandem.

As foreshadowed above the operating characteristics of the described arrangement may be altered by variation of, inter alia, the position of pin 15 and the alignment of slot 14. In particular, the radial position of pin 15 relative to the pitch circle of crank 11 will determine the angle through which lever 9 may be swung, at greater radii the swing angle is reduced and, conversely at shorter radii the swing angle is increased and it is also possible to obtain an over centre action to "lock" the door 1 in both the open and closed positions.

The characteristics of the sliding fulcrum mechanism can be further modified by the angular alignment of slot 14. The position of the inner end of the slot 14 is determined by positioning of pin 15 but, the outer end and the configuration of the slot can be chosen to provide modifications to the door trajectory. In the arrangement of FIG. 1 the axis of slot 14 passes through pivots 8 and 10 at opposite ends of lever 9, since the slotted member 13 is rigidly attached to, or formed integrally with, lever 9 this relationship is maintained throughout door movement including the open door position. Thus, it follows that any other slot alignment will modify not only the intermediate door positions, i.e. the course of a door trajectory, but also its open position. It follows further, that, where it is desired to provide a different trajectory but the same open position the slot 14 may be given an appropriately curved configuration.

Figure 2:
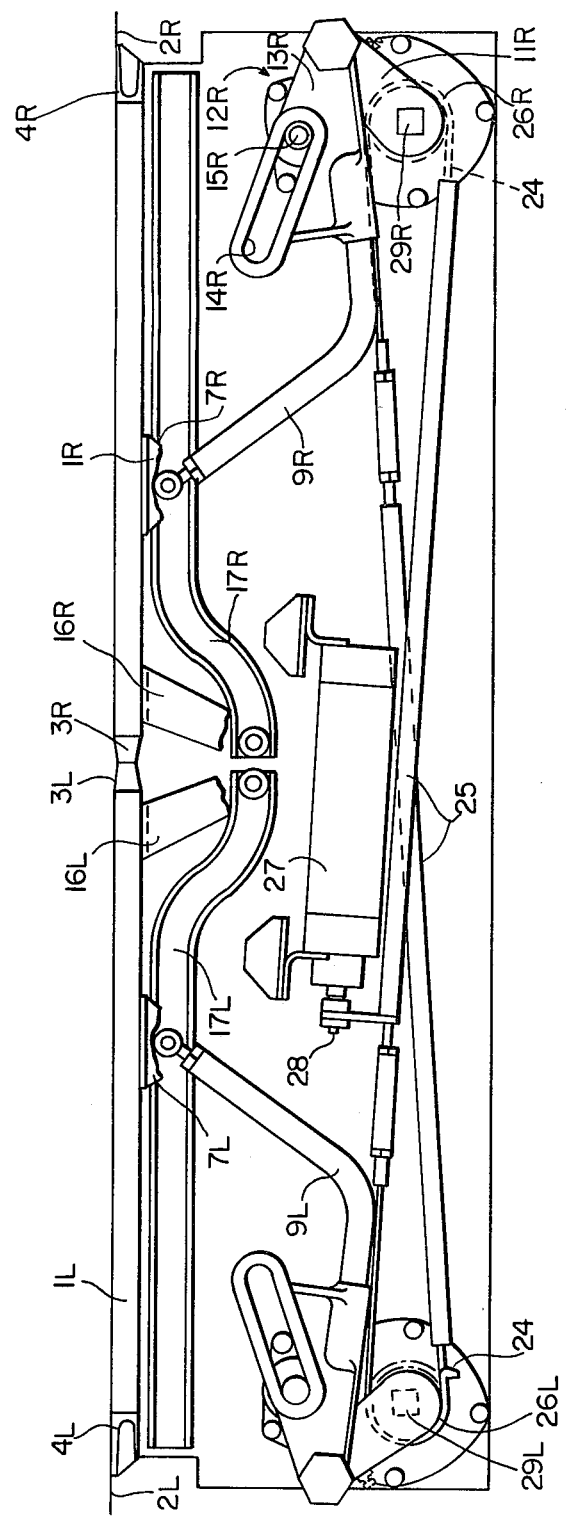
FIG. 2 shows a plan view of the door operating gear of a double bi-parting doors arrangement.

Referring now to FIG. 2 there is shown the operating arrangement employing the principle of the FIG. 1 arrangement adapted to operate bi-parting double doors of the type commonly found in rapid-transit vehicles. In the drawings like parts are given like references with the addition of suffixes R or L, to indicate right or left, as appropriate. It will be seen that the FIG. 2 arrangement comprises an arrangement identical to FIG. 1 with a curved guiding track to operate the right hand door, the part references of which carry the suffix R, and a mirror-imaged arrangement to operate the left hand door, the part references of which carry the suffix L.

The operation of the arrangement follows that described above in connection with FIG. 1 except that whereas the right-hand driving crank 11R rotates clockwise to open the right-hand door, the left-hand crank 11L rotates anti-clockwise to open the left-hand door and, of course, the left and right-hand operations take place simultaneously.

The two cranks 11R and 11L are both driven by a roller chain 24 with solid links 25 in the form of a figure of eight passing around chain wheels 26R and 26L rigidly attached to respective cranks 11R and 11L. The motive force for operating the doors is supplied by a double acting pneumatic cylinder 27, having a piston rod 28 directly coupled to one of the solid links 25 of the driving chain.

In the arrangement illustrated the two operating mechanisms shown are positioned at the top of the doors, and housed in the ceiling of a vehicle, and a further two identical mechanisms (not shown) are positioned at the bottom of the doors and housed under the vehicle floor. The top and bottom mechanisms for each door are connected and synchronised by vertical shafts 29R and 29L extending the full height of the doors 1R and 1L and on which the chain wheels 26R and 26L are solidly mounted. The vertical shafts 29R and 29L run in journal bearings (not shown) at the top and bottom, at least. In a double tandem arrangement with mechanisms at the top and bottom of the doors it would however not be possible to mount the cranks of the parts of each tandem arrangement nearest the centre-line of the doorway on a common shaft. In this case these mechanisms would preferably comprise dummy or idling mechanisms simply acting as guides for the trailing edges of the doors. However, for the sake of simplicity it is preferred to adopt the track or long arm guiding means illustrated in FIG. 1 which also enjoy the advantage of being relatively cheaper.

Having thus described my invention what I claim is:

1. A swinging plug door comprising a plug door pivotally attached to one end of a swinging lever which is pivotally attached at its other end to a rotatable driving crank and, intermediate said ends has a sliding fulcrum mechanism in which the fulcrum axis of the lever is slidable along a path lying in a direction generally between the crank and the door such that, in operation, rotation of the crank causes the lever to swing about its fulcrum axis and to slide relative thereto to carry the door through a flattened arc between open and closed positions.

2. A swinging plug door according to claim 1 wherein the sliding fulcrum mechanism comprises a member fixed relative to the lever and having formed therein an elongate slot engaged with a stationary pin which constitutes the fulcrum axis about which the lever pivots.

3. A swinging plug door according to claim 1 or claim 2 wherein the fulcrum axis of the lever lies on the pitch circle of the attachment of the lever to the driving crank.

4. A swinging plug door according to claim 2 wherein the elongate slot of the sliding fulcrum mechanism is aligned with the ends of the lever.

5. A swinging plug door according to claim 1 or claim 2 wherein the swinging lever is pivotally attached to the door nearer to the edge which is trailing in an opening movement than to the leading edge.

6. A swinging plug door according to claim 2 wherein the trailing edge of the door is guided by a curved track between open and closed positions.

7. A swinging plug door according to claim 2 wherein the trailing of the door is guided by a straight track between open and closed positions.

8. A swinging plug door according to claim 2 wherein the trailing edge of the door is guided by a pivot arm relatively longer than the swinging lever.

9. A swinging plug door according to any one of claims 6, 7 or 8 wherein the trailing edge of the door is guided by means of a duplicate swinging lever with sliding fulcrum arrangement.

10. A bi-parting door arrangement comprising a pair of swinging plug doors each according to claim 9 and wherein the doors are adapted to move in opposite directions.

* * * * *